(12) United States Patent
Park

(10) Patent No.: US 11,823,516 B2
(45) Date of Patent: Nov. 21, 2023

(54) BOARDING PASS CHECKING DEVICE, AND METHOD FOR CHECKING BOARDING PASS USING SAME

(71) Applicant: KOREAN AIR LINES CO., LTD., Seoul (KR)

(72) Inventor: Dong Wook Park, Gimpo-si (KR)

(73) Assignee: KOREAN AIR LINES CO., LTD., Seoul (KR)

( * ) Notice: Subject to any disclaimer, the term of this patent is extended or adjusted under 35 U.S.C. 154(b) by 91 days.

(21) Appl. No.: 17/440,720

(22) PCT Filed: Mar. 19, 2020

(86) PCT No.: PCT/KR2020/003737
§ 371 (c)(1),
(2) Date: Mar. 17, 2022

(87) PCT Pub. No.: WO2020/190041
PCT Pub. Date: Sep. 24, 2020

(65) Prior Publication Data
US 2022/0245983 A1 Aug. 4, 2022

(30) Foreign Application Priority Data
Mar. 20, 2019 (KR) .......................... 10-2019-0031882

(51) Int. Cl.
*G07C 9/28* (2020.01)
*G07C 9/27* (2020.01)

(52) U.S. Cl.
CPC .................. *G07C 9/28* (2020.01); *G07C 9/27* (2020.01); *G07C 2209/41* (2013.01)

(58) Field of Classification Search
CPC .................................. G07C 9/28; G07C 9/27
See application file for complete search history.

(56) References Cited

U.S. PATENT DOCUMENTS

2008/0302870 A1* 12/2008 Berini ................ H04L 63/0861
235/380
2010/0308108 A1* 12/2010 Choi ........................ G07C 9/10
235/382

FOREIGN PATENT DOCUMENTS

JP  S62-156793 A  7/1987
JP  S63-054692 A  3/1988
(Continued)

OTHER PUBLICATIONS

International Search Report dated Jun. 25, 2020 in International Application No. PCT/KR2020/003737, in 5 pages.
(Continued)

*Primary Examiner* — Nabil H Syed
(74) *Attorney, Agent, or Firm* — Knobbe, Martens, Olson & Bear, LLP

(57) ABSTRACT

This application relates to a boarding pass processing device. In one aspect, the device includes a communication unit for communicating with a central server and a boarding pass recognition unit for recognizing a boarding pass held by a passenger. The device may also include a boarding processing unit for, if procedure information relating to whether a passenger holding a boarding pass recognized by the boarding pass recognition unit has gone through a procedure required for boarding an airplane is obtained from the central server through the communication unit, processing whether or not the passenger holding the recognized boarding pass has boarded the airplane, on the basis of the obtained procedure information.

12 Claims, 12 Drawing Sheets

(56) References Cited

FOREIGN PATENT DOCUMENTS

| | | |
|---|---|---|
| JP | 2002-366983 A | 12/2002 |
| JP | 2005-050243 A | 2/2005 |
| JP | 2005-196548 A | 7/2005 |
| JP | 2007-141158 A | 6/2007 |
| JP | 2009-230162 A | 10/2009 |
| JP | 2011-215725 A | 10/2011 |
| JP | 2013-218666 A | 10/2013 |
| JP | 2016-009288 A | 1/2016 |
| JP | 2017-078952 A | 4/2017 |
| KR | 10-2009-0077069 A | 7/2009 |
| KR | 10-2012-0039177 A | 4/2012 |
| KR | 10-1636017 B1 | 7/2016 |
| WO | 2008/055181 A2 | 5/2008 |

OTHER PUBLICATIONS

Extended European Search Report in European Application No. 20774641.3 dated Oct. 18, 2022.
Office Action in Japanese Application No. 2022-504492 dated on Nov. 29, 2022 and English translation.
Office Action dated Jul. 4, 2023 in Japanese Application No. 2022-504492 and English translation.

* cited by examiner

FIG.8

| | NORMAL (1) | | IRR (1) | |
|---|---|---|---|---|
| | NAME | | CHK-IN | GATE DOOR |
| 1 | LEE/ DAEHAN | 36A Y | ● | ● ○ |

FIG. 9

| SKT | | ⏰ 📶 98% PM 2:08 | |
|---|---|---|---|
| ≪ | | DIFFER LIST | |
| NORMAL | (1) | IRR | (1) |
| | NAME | | SEAT |
| 1  GATE | PARK/DAEHAN | | 42D |
| DOOR | PARK/DAEHAN | | 36A |

FIG. 11

| SKT | | | | 98% PM 2:08 | |
|---|---|---|---|---|---|
| ‹ | | RESULTS | | | ⟳ |

| KE0012 | 08MAR19 | LAX – ICN |
|---|---|---|

| DOOR | F | C | Y | TTL | G.TTL |
|---|---|---|---|---|---|
| L1 | 8+0 | 0+0 | 288+1 | 296+1 | 297 |
| UL1 | 0+0 | 93+1 | 3+0 | 96+1 | 97 |
| TTL | 8+0 | 93+1 | 291+1 | 392+2 | |
| G.TTL | 8 | 94 | 292 | 394 | 394 |
| GATE | 8+0 | 93+1 | 292+1 | 393+2 | 395 |
| CHKIN | 8+0 | 93+1 | 292+1 | 393+2 | 395 |

\* PASSENGERS: 394/
EXTRA: 1 PERSON/
TOTAL PASSENGERS: 395

| SEND MESSAGE |
|---|

BOARDING PASS CHECKING DEVICE, AND METHOD FOR CHECKING BOARDING PASS USING SAME

The present application is a U.S. national phase application under 35 U.S.C. § 371 of International Application No. PCT/KR2020/003737, filed on Mar. 19, 2020, which claims the benefit of Korean Patent Application No. 10-2019-0031882 filed on Mar. 20, 2019 in the Korean Intellectual Property Office, the entire disclosure of each of which is incorporated herein by reference.

TECHNICAL FIELD

The present disclosure relates to a boarding pass checking (verification) device and a method for checking (verifying) a boarding pass using the same.

BACKGROUND

Before an airplane takes off, various procedures need to be performed.

In the aspect of a passenger, the passenger needs to be issued a boarding pass through a check-in process and go through a security check procedure and an immigration procedure. Furthermore, the boarding pass needs to be checked at the gate in an airport, and then, checked again at a door of an airplane.

In the aspect of a flight attendant or an airport that handles a boarding procedure of passengers, the flight attendant or a staff in the airport needs to perform an issuance task of a boarding pass, a security check task, and an immigration task, and further, check the boarding pass at the gate and check the boarding pass again at the door of the airplane. Furthermore, the flight attendant needs to verify the number of passengers that have completed the check-in, the number of passengers that have passed through the gate, the number of passengers that have passed through the door of the airplane, and the number of passengers on board.

The airplane may take off only in the case that all procedures described above are performed and verified.

A part of the various procedures mentioned above, which needs to be performed before an airplane takes off, has been performed by a human. For example, the procedure of checking a boarding pass at a door of an airplane, the procedure of counting the number of passengers that have passed through the door of the airplane, and the number of passengers on board are performed by a flight attendant. That is, the tasks mentioned above are performed by a person.

However, since the tasks are performed by a human, a problem frequently occurs. For example, despite the difference between the number of passengers that have passed through the gate and the number of passengers on board, the flight attendant may miscount and conclude that the numbers are matched, and a case often occurs that the airplane takes off without correctly matching the numbers. Accordingly, the airplane takes off with a problem sometimes. In addition, the problems owing to boarding number such as a boarding number mismatch or a duplicated boarding. Furthermore, the takeoff may be delayed due to the process of counting the number of passengers personally by the flight attendant, which leads to the delay of the flight time.

SUMMARY

The present disclosure provides a technique of automatically performing the various procedures mentioned above, which need to be performed before an airplane takes off, without performing by a human.

The present disclosure also provides a technique of performing the various procedures quickly and without any problems.

However, the problem to be solved by the present disclosure is not limited thereto, and may be variously expanded in an environment within a range not departing from the idea and the scope of the present disclosure.

In accordance with an aspect of the present disclosure, there is provided a device for processing a boarding pass, the device including: a communication unit configured to communicate with a central server; a boarding pass identification unit configured to identify a boarding pass held by a passenger; and a boarding processing unit configured to process, when procedure information on whether the passenger having the boarding pass identified by the boarding pass identification unit has gone through procedures required to board an airplane is obtained from the central server through the communication unit, whether the passenger having the identified boarding pass is authorized to board based on the obtained procedure information.

Further, the procedure information includes information for at least one procedure including a check-in procedure for issuing the boarding pass to the passenger having the identified boarding pass and a boarding pass verification procedure at a gate for the passenger having the identified boarding pass to board the airplane after the check-in procedure.

The device described above may further include a control unit configured to identify information for a procedure that the passenger having the identified boarding pass has not gone through and transmit an alarm message to a device that processes the procedure that the passenger having the identified boarding pass has not gone through.

The device described above may further include an output unit configured to identify information for a procedure that the passenger having the identified boarding pass has not gone through and output the information for the procedure that the passenger having the identified boarding pass has not gone through.

Further, flight information of the airplane may be obtained from the central server through the communication unit, and the boarding processing unit may receive the information for the identified boarding pass from the boarding pass identification unit, extract flight information of the airplane from the information for the identified boarding pass, compare the obtained flight information of the airplane with the extracted flight information of the airplane, and determine whether the passenger having the identified boarding pass duly boards the airplane.

Further, information for the passenger on board may be obtained from the central server through the communication unit, and the boarding processing unit may determine whether the passenger having the identified boarding has already been checked based on the information for the passenger on board.

Further, the boarding processing unit may calculate a total number of passengers on board whenever a boarding pass is checked by the boarding pass identification unit.

Further, information for the passengers on board through a plurality of airplane doors provided in the airplane may be obtained from the central server through the communication unit, and the boarding processing unit may calculate a total number of passengers on board based on the obtained information for the passengers on board.

Further, seat information prepared in the airplane may be obtained from the central server through the communication unit. Further, the boarding processing unit may receive the information for the identified boarding pass from the boarding pass identification unit, extract seat information of the passenger having the identified boarding pass from the information for the identified boarding pass, and determine a guide direction toward a passenger seat for the passenger having the identified boarding pass based on the extracted seat information and the obtained seat information. The boarding processing unit may further include an output unit configured to display the determined guide direction.

The device may further include an input unit configured to receive information for an airplane door to which the device for processing a boarding pass is disposed among a plurality of airplane doors provided in the airplane. Further, the boarding processing unit may determine the guide direction toward the passenger seat for the passenger having the identified boarding pass by additionally considering the input information for the airplane door to which the device for processing a boarding pass is disposed.

Further, the boarding processing unit may obtain a total number of passengers that have gone through the procedures from the obtained procedure information, and obtain a total number of passengers having boarding passes identified by the boarding pass identification unit. The device may further include an output unit configured to display information for one or more passengers that cause a difference between the total number of passengers that have gone through the procedures and the total number of passengers having the boarding passes identified by the boarding pass identification unit.

In accordance with another aspect of the present disclosure, there is provided a method for processing a boarding pass using a device for processing the boarding pass, the method including: identifying a boarding pass held by a passenger; obtaining procedure information on whether the passenger having the identified boarding pass have gone through procedures required to board an airplane, from the central server; and processing whether the passenger having the identified boarding pass is authorized to board based on the obtained procedure information.

Advantageous Effects

The boarding pass verification procedure at the airplane door and the check procedure before the takeoff can be performed by the boarding pass processing device according to the embodiment, not by a human. Therefore, a wrong boarding or a duplicated boarding of a passenger can be checked quickly without an error.

In addition, the procedure of counting the number of passengers that have passed through the airplane door, and the procedure of comparing the number of passengers that have completed the check-in procedure and the number of passengers that have passed through the gate with the number of passengers that have passed through the airplane door can also be performed by the boarding pass processing device according to the embodiment. Accordingly, the time consumed for the counting procedure and the comparison procedure is reduced, and a takeoff delay of the airplane may be prevented.

Furthermore, in the case that the number of passengers that have completed the check-in procedure, the number of passengers that have passed through the gate, and the number of passengers counted on board are not matched, a flight attendant may check the passenger that causes the problem, the occupied seat by the passenger or the assigned seat to the passenger, and the information of procedures that the passenger has gone through successfully by using the boarding pass processing device 100 according to an embodiment.

BRIEF DESCRIPTION OF THE DRAWINGS

FIGS. 7 and 8 illustrate an example of a screen displayed on the boarding pass processing device according to an embodiment.

FIG. 9 is a flowchart illustrating a method for processing a boarding pass using the boarding pass processing device according to an embodiment.

FIG. 11 shows a result of the summation of the numbers of the passengers that have passed through respective airplane doors when there is a plurality of airplane doors in the airplane.

DETAILED DESCRIPTION

The advantages and features of exemplary embodiments of the present disclosure and methods of accomplishing them will be clearly understood from the following description of the embodiments taken in conjunction with the accompanying drawings. However, the present disclosure is not limited to those embodiments and is implemented in various forms. It is noted that the embodiments are provided to make a full disclosure and also to allow those skilled in the art to know the full scope of the present disclosure.

In the following description, well-known functions and/or configurations will not be described in detail if they would unnecessarily obscure the features of the disclosure. Further, the terms to be described below are defined in consideration of their functions in the embodiments of the disclosure and vary depending on a user's or operator's intention or practice. Accordingly, the definition is made on a basis of the content throughout the present disclosure.

Hereinafter, the term "airplane" is used for all types of airplanes. For example, the airplane may include a passenger plane that carries passengers and a cargo plane that carries goods.

Figure 1:
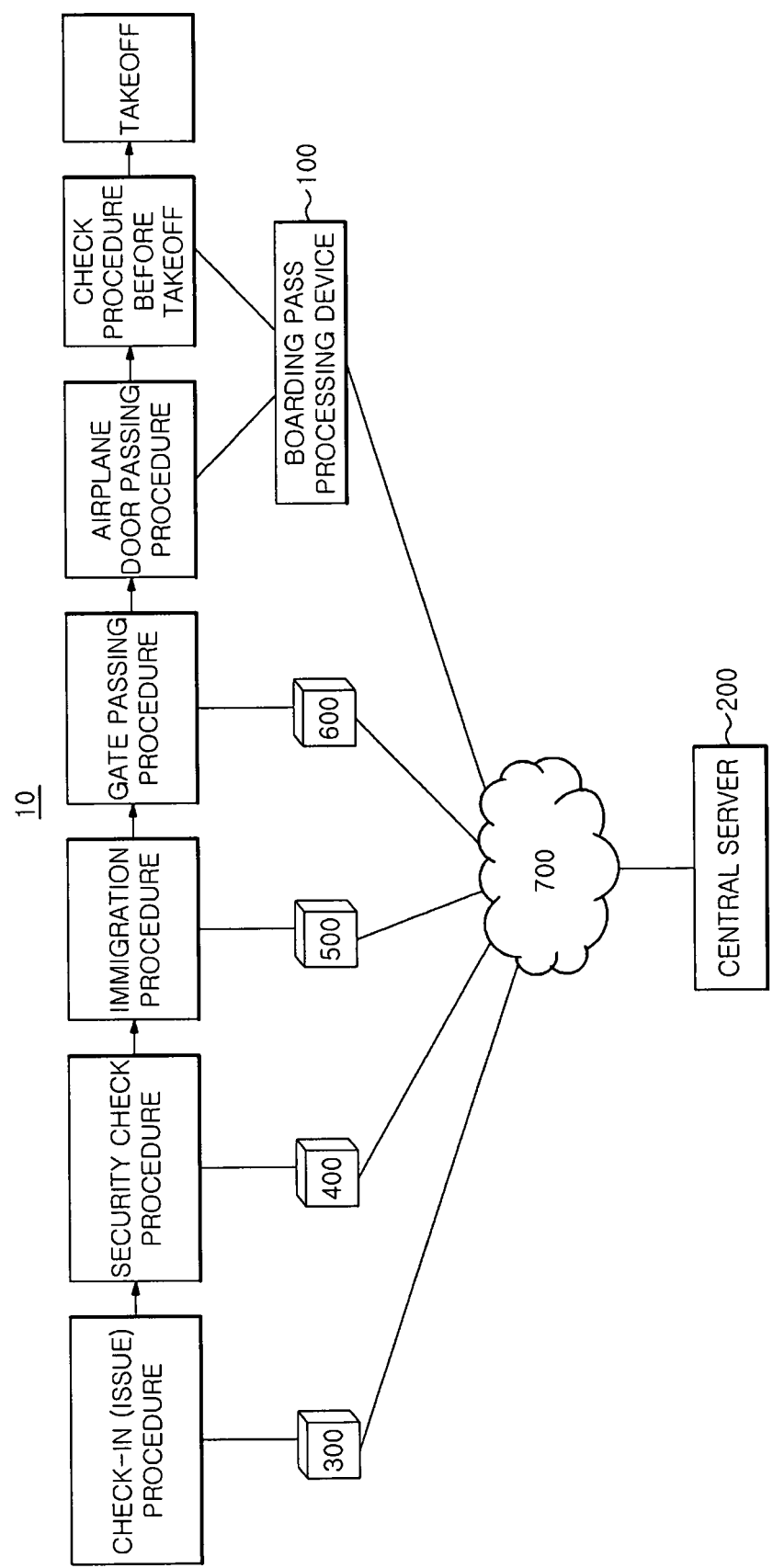
FIG. 1 is a conceptual diagram illustrating a boarding pass processing system including a boarding pass processing device.

FIG. 1 is a conceptual diagram illustrating a boarding pass processing system 10 including a boarding pass processing device 100. Referring to FIG. 1, the boarding pass processing system 10 includes the boarding pass processing device 100, a central server 200, a check-in procedure processing device 300, a security check procedure processing device 400, an immigration procedure processing device 500, and a gate passing procedure processing device 600. The components 100 to 600 are connected via a network 700. Here, the network 700 may include various networks that support a wired or wireless communication.

Meanwhile, the components included in the boarding pass processing system 10 mentioned above are merely exemplary. Accordingly, a part of the components mentioned above may not be included in the boarding pass processing system 10, or a component not mentioned above may be included in the boarding pass processing system 10. For example, the security check procedure processing device 400, the immigration procedure processing device 500, and the gate passing procedure processing device 600 may not be included in the boarding pass processing system 10. However, hereinafter, the present disclosure is described based on the boarding pass processing system 10 having the embodiment as shown in FIG. 1.

FIG. 1 shows the procedures for a passenger to go through to board an airplane at an airport, and the devices 100, 300 to 600 related to the procedures are shown in FIG. 1.

Among the devices, the check-in procedure processing device 300 processes the procedure in relation to a check-in, the security check procedure processing device 400 processes the procedure in relation to a security check, the immigration procedure processing device 500 processes the procedure in relation to an immigration, and the gate passing procedure processing device 600 processes the verification procedure for a boarding pass of a passenger who intends to pass through a gate. Each of the devices 300 to 600 may be implemented in a computer.

Furthermore, the boarding pass processing device 100 processes the verification procedure for a boarding pass or a passport of a passenger who intends to pass through a door of an airplane. The boarding pass processing device 100 may be implemented in a mobile terminal.

Hereinafter, each component shown in FIG. 1 is described in more detail.

Referring to FIG. 1, a passenger issues a boarding pass through a check-in (issue) procedure. In this case, the information of a passenger to which the boarding pass is issued and the information on whether the passenger has gone through a check-in procedure according to a predetermined criterion are transmitted from the check-in procedure processing device 300 to the central server 200 via the network 700.

The passenger that have completed the check-in procedure goes through a security check procedure. In this case, the information for the passenger that have completed the check-in procedure and the information on whether the passenger has gone through the security check procedure according to a predetermined criterion are transmitted from the security check procedure processing device 400 to the central server 200 via the network 700.

The passenger that have completed the security check procedure goes through an immigration procedure. In this case, the information for the passenger that have completed the immigration procedure and the information on whether the passenger has gone through the immigration procedure according to a predetermined criterion are transmitted from the immigration procedure processing device 500 to the central server 200 via the network 700.

The passenger that have completed the immigration procedure goes through a gate passing procedure. In the gate passing procedure, the boarding pass of the passenger who intends to pass through the gate is verified. Through the gate passing procedure, it is verified if the passenger is going to board a different airplane which is not designated to the passenger (wrong boarding), or another person not designated to the airplane is going to board the airplane. The information for the passenger that have completed the gate passing procedure or the information on whether the passenger has gone through the gate passing procedure according to a predetermined criterion is transmitted from the gate passing procedure processing device 600 to the central server 200 via the network 700.

The passenger that have completed the gate passing procedure goes through an airplane door passing procedure. The airplane door is referred to as a door provided in an airplane. One or more airplane doors may be provided in an airplane.

In the airplane door passing procedure, the boarding pass of the passenger who intends to pass through the airplane door is verified. Through the airplane door passing procedure, it is verified a wrong boarding or a duplicated boarding (the case that a person that already passed through the airplane door is going to pass through the airplane door again), and the number of passengers that have passed through the airplane door may be counted. Furthermore, through the airplane door passing procedure, the information on whether the passenger who intends to pass through the airplane door has gone through the previous procedures such as the security check procedure, the immigration procedure, or the gate passing procedure through the respective predetermined criterions may be verified. If the passenger did not go through any procedure according to the predetermined criterion, an alarm message may be transmitted to the device that processes the corresponding procedure. The airplane door passing procedure is performed by the boarding pass processing device 100 according to an embodiment.

In the check procedure before a takeoff, the number of passengers on board is checked. Furthermore, a comparison procedure is performed whether the number of passengers that have completed the check-in procedure, the number of passengers that have passed through the gate, and the number of passengers counted on board are the same. The check procedure before a takeoff is performed by the boarding pass processing device 100 according to an embodiment.

As a result of the comparison procedure described above in the check procedure before a takeoff, in the case that the number of passengers that have completed the check-in procedure, the number of passengers that have passed through the gate, and the number of passengers counted on board are matched, the airplane may take off. However, if the numbers are not matched, the airplane is unable to take off. In this case, a flight attendant may check the passenger that causes the problem, the occupied seat by the passenger or the assigned seat to the passenger, and the information of procedures that the passenger has gone through successfully by using the boarding pass processing device 100 according to an embodiment.

As described above, the boarding pass verification procedure at the airplane door and the check procedure before a takeoff may be performed by the boarding pass processing device 100 according to an embodiment, not by a human. Therefore, a wrong boarding or a duplicated boarding of a passenger may be checked quickly without an error.

In addition, the procedure of counting the number of passengers that have passed through the airplane door, and the procedure of comparing the number of passengers that have completed the check-in procedure and the number of passengers that have passed through the gate with the number of passengers that have passed through the airplane door may also be performed by the boarding pass processing device 100 according to an embodiment. Accordingly, the time consumed for the counting procedure and the comparison procedure is reduced, and a takeoff delay of the airplane may be prevented.

Furthermore, in the case that the number of passengers that have completed the check-in procedure, the number of passengers that have passed through the gate, and the number of passengers counted on board are not matched, a flight attendant may check the passenger that causes the problem, the occupied seat by the passenger or the assigned seat to the passenger, and the information of procedures that the passenger has gone through successfully by using the boarding pass processing device 100 according to an embodiment.

The central server 200 is a server that transmits and receives information to and from the devices 100, 300 to 600 described above via the network 700. For example, the central server 200 may receive the information of a passenger that performs the check-in procedure from the check-in procedure processing device 300 via the network 700 and may transmit the received information to the boarding pass processing device 100 via the network 700. In addition, the central server 200 may receive the information of a passenger that passes through the gate from the gate passing procedure processing device 600 via the network 700 and may transmit the received information to the boarding pass processing device 100 via the network 700.

Furthermore, the central server 200 may provide various types of information to the boarding pass processing device 100. For example, the central server 200 may provide flight information (a flight number, a point of departure, a point of destination, a time of departure, a time of destination, etc.) for the airplane to which the boarding pass processing device 100 is disposed, information of a passenger that reserves to board the airplane, or information of a seat prepared in the airplane to the boarding pass processing device 100 via the network 700.

Hereinafter, the boarding pass processing device 100 according to an embodiment is described in more detail.

Figure 2:
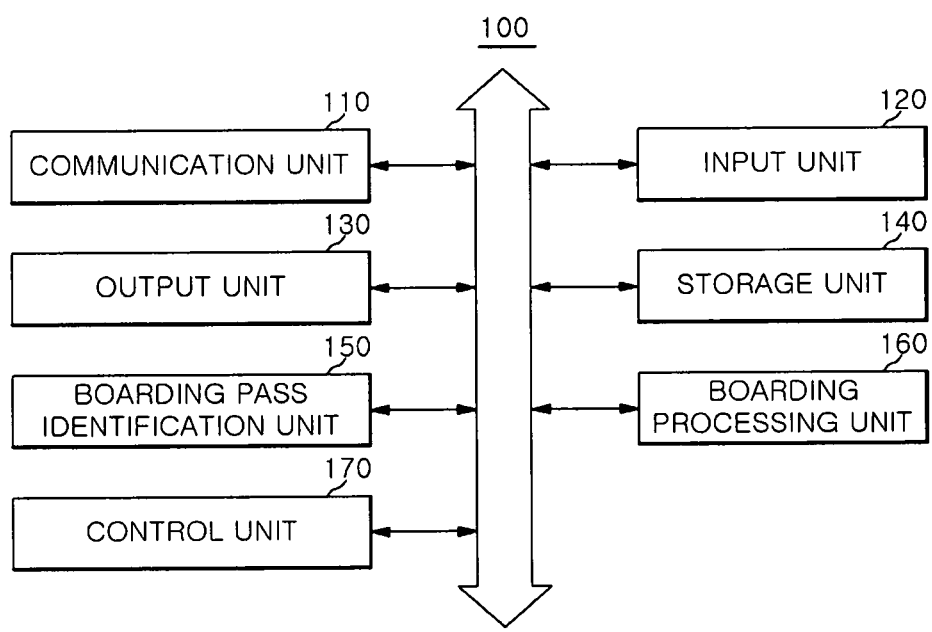
FIG. 2 is a schematic diagram for the boarding pass processing device according to an embodiment.

FIG. 2 is a schematic diagram for the boarding pass processing device 100 according to an embodiment. Referring to FIG. 2, the boarding pass processing device 100 includes a communication unit 110, an input unit 120, an output unit 130, a storage unit 140, a boarding pass identification unit 150, a boarding processing unit 160, and a control unit 170. However, the configuration shown in FIG. 2 is merely exemplary. The boarding pass processing device 100 may not include at least one of the input unit 120, the output unit 130, the storage unit 140, and the control unit 170. Hereinafter, each of the components is described.

The communication unit 110 may be implemented through a wireless communication module which is publicly known.

The input unit 120 may be implemented through an interface for inputting predetermined information from a user, for example, a flight attendant. For example, the input unit 120 may be implemented by a touch screen, a touch pad, a keypad, or a button. A flight attendant may input information for an airplane to which the boarding pass processing device 100 is disposed, such as airplane type or flight number by using the input unit 120. In the case that a plurality of airplane doors is provided in the airplane, a flight attendant may input the information of an airplane door to which the boarding pass processing device 100 is disposed among the plurality of airplane doors.

The output unit 130 may be implemented through a module for outputting or displaying information. For example, the output unit 130 may be implemented through a liquid crystal display (LCD) panel or a light emitting diode (LED) panel. A flight attendant may be provided with various types of information through the output unit 130. For example, a flight attendant may be provided with information of an airplane to which the boarding pass processing device 100 is disposed, information of a boarding pass verifying result for a passenger, or information of a guide direction toward a passenger seat through the output unit 130.

The storage unit 140 may be implemented through a module for storing information. For example, the storage unit 140 may store various types of information obtained through the communication unit 110 from the central server 200.

The boarding pass identification unit 150 may be implemented through a module for identifying a boarding pass. The boarding pass identification unit 150 may be a module for identifying an electrically identifiable code printed on the boarding pass, for example, a 2-dimensional code such as PDF417 or QR code, a 1-dimensional code such as a bar code, or a passport OCR code.

Referring back to FIG. 2, each of the boarding processing unit 160 and the control unit 170 may be implemented by a software module or a hardware module, or implemented by a form in which a software module and a hardware module are combined.

Specifically, the boarding processing unit 160 processes the boarding of the passenger. Here, the processing of the boarding of the passenger may include determining whether the boarding of a passenger on the airplane is allowed. In the case that the boarding of the passenger on the airplane is allowed, the boarding processing unit 160 may process that the passenger boards the airplane and update the total number of passengers that board the airplane. In addition, the boarding processing unit 160 may determines a guide direction toward a passenger seat for the passenger, and the output unit 130 may display the determined guide direction.

On the other hand, the boarding of the passenger on the airplane may not be allowed. For example, in the case that the passenger does not pass through at least one procedure among the procedures required to board the airplane according to a predetermined criterion, or the boarding is a wrong boarding or a duplicated boarding, the boarding of the passenger on the airplane may not be allowed. In this case, the boarding processing unit 160 may determine the reason that the boarding of the passenger is not allowed or the problem therefor, and the output unit 130 may output the result determined by the boarding processing unit 160.

Here, in the processing of the boarding of the passenger, the boarding processing unit 160 may use information obtained from the central server 200 through the communication unit 110.

For example, when procedure information on whether the passenger having the boarding pass has gone through the procedures required to board the airplane according to a predetermined criterion is obtained from the central server 200 through the communication unit 110, the boarding processing unit 160 may determine whether the passenger that goes through the airplane door passing procedure with the boarding pass is allowed to board the airplane based on the information obtained as such.

In addition, when information for a passenger scheduled to board the airplane is obtained from the central server 200 through the communication unit 110, the boarding processing unit 160 may determine a wrong boarding for the passenger that goes through the airplane door passing procedure with the boarding pass.

Furthermore, when information for a passenger that already boards the airplane is obtained from the central server 200 through the communication unit 110, the boarding processing unit 160 may determine a duplicated boarding for the passenger that goes through the airplane door passing procedure with the boarding pass.

In addition, when information for a passenger scheduled to board the airplane is obtained from the central server 200 through the communication unit 110, the boarding processing unit 160 may determine whether the boarding pass held by the passenger when passing the gate is different from the boarding pass held by the passenger when passing the airplane door.

The control unit 170 may perform various controls for the boarding pass processing device 100. For example, in the case that there is a passenger that did not go through at least one procedure among the procedures required to board the airplane according to a predetermined criterion, the control unit 170 may control such that an alarm message is transmitted to the devices 300 to 600 that process the procedure which is not performed according to the predetermined criterion. In this case, the alarm message may be transmitted through the communication unit 110.

Here, a determination on whether there is a passenger that did not go through at least one procedure among the procedures required to board the airplane according to a predetermined criterion may be checked from procedure information obtained from the central server 200 through the communication unit 110.

Hereinafter, the method or procedure of operation using the boarding pass processing device 100 is described.

The boarding pass processing device 100 is disposed at an airplane door provided in the airplane. In the case that a plurality of airplane doors is provided in the airplane, the boarding pass processing device 100 may be disposed at each of the airplane doors.

Figure 3:
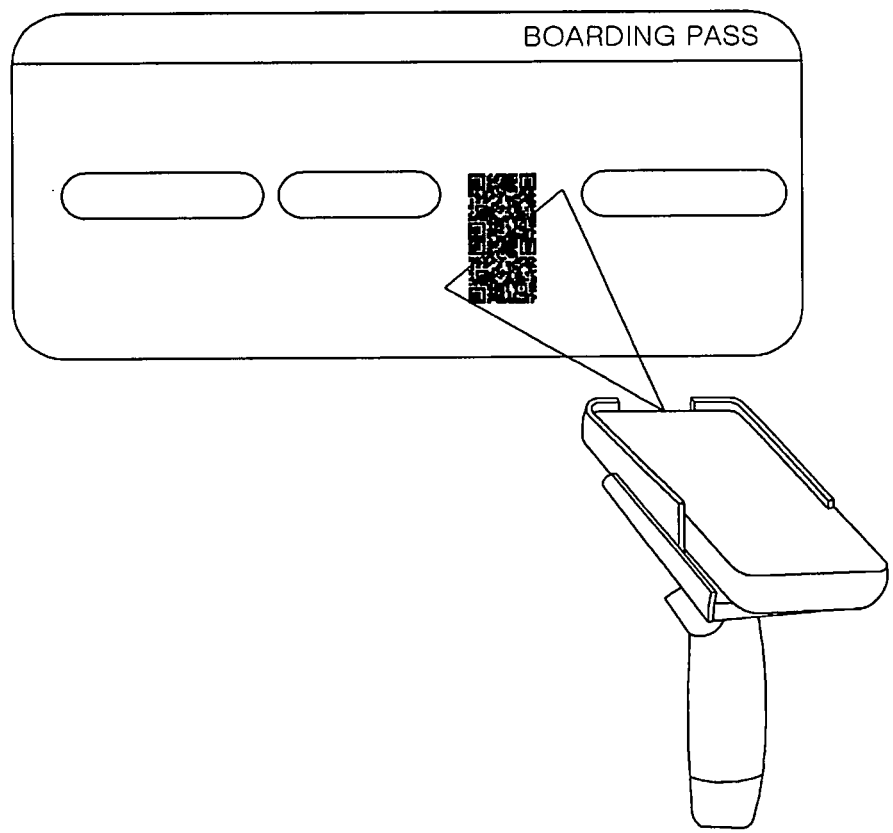
FIG. 3 schematically shows a case where a boarding pass is identified by the boarding pass processing device according to an embodiment.

When a passenger that completes from the check-in procedure to the gate passing procedure arrives at an airplane door provided in the airplane, a boarding pass of the passenger is identified by the boarding pass identification unit 150 included in the boarding pass processing device 100. FIG. 3 schematically shows a case where a boarding pass is identified by the boarding pass processing device 100.

The information for the boarding pass identified by the boarding pass identification unit 150 is transmitted to the boarding processing unit 160.

The boarding processing unit 160 extracts various types of information from the transmitted information. For example, the boarding processing unit 160 may extract information for a passenger having the boarding pass or flight information for the airplane that the passenger having the corresponding boarding pass can board.

Meanwhile, the various types of information obtained from the central server 200 through the communication unit 110 may be provided to the boarding pass processing device 100. For example, information of the total passengers scheduled to board the airplane or information for the airplane (flight information, seat information, or the like) may be provided from the central server 200 through the communication unit 110.

In addition, the procedure information on whether each of the passengers scheduled to board the airplane has gone through the check-in procedure, the security check procedure, the immigration procedure, or the gate passing procedure according to a predetermined criterion may be provided from the central server 200 through the communication unit 110, and the information may be provided to the central server 200 through the network 700 from each of the devices 300 to 600 in advance.

Furthermore, the information for a passenger that already boards the airplane may be provided in real time from the central server 200 through the communication unit 110.

Here, the control unit 170 may send a request to the central server 200, if necessary, to provide the information to the boarding pass processing device 100 from the central server 200 through the communication unit 110. Alternatively, the central server 200 may provide the information periodically to the boarding pass processing device 100 without the request of the control unit 170.

The boarding processing unit 160 processes the boarding of the passenger having the boarding pass by using the information provided in the above manner (hereinafter, referred to as "provided information") and the information extracted from the boarding pass information received from the boarding pass identification unit 150 (hereinafter, referred to as "extracted information"). Hereinafter, a detailed example therefor is described.

Figure 4:
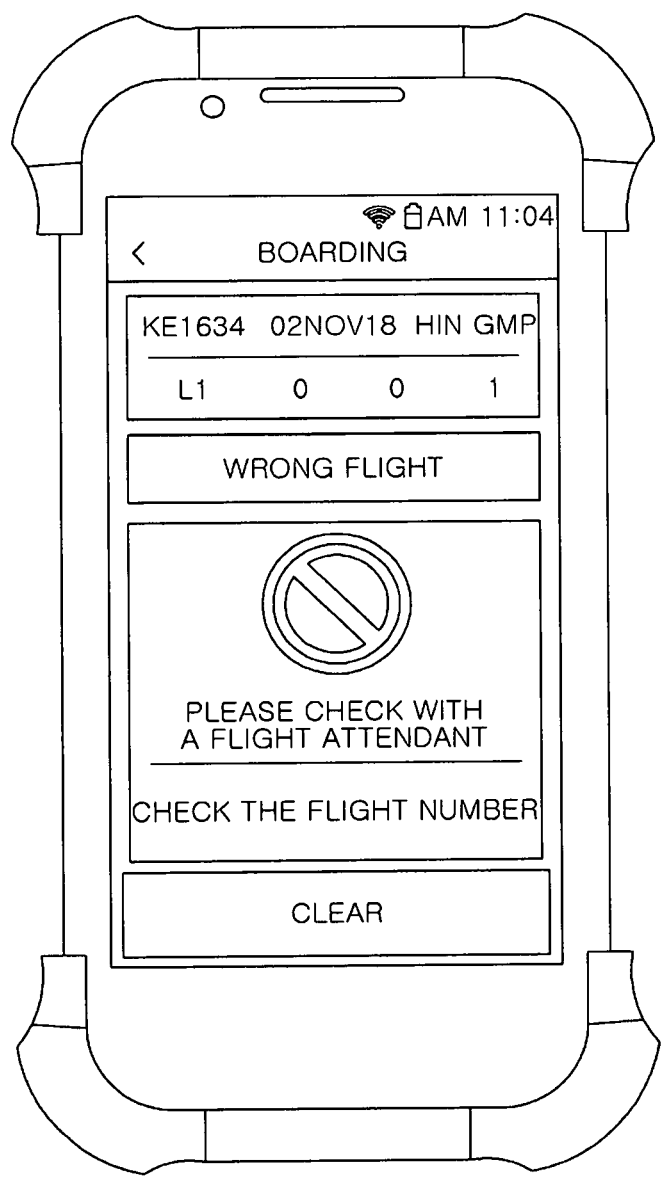
FIG. 4 illustrates an example of a screen displayed on the boarding pass processing device according to an embodiment when a wrong boarding is determined.

The boarding processing unit 160 compares the provided information with the extracted information and determines whether the information of the passenger having the boarding pass is included in the information of the total passengers scheduled to board the airplane. In the case that the information of the passenger having the boarding pass is not included in the information of the total passengers scheduled to board the airplane, the boarding processing unit 160 determines a wrong boarding for the passenger. That is, the boarding processing unit 160 determines that a passenger who is not allowed to board the airplane is intended to board. FIG. 4 is an example showing that "WRONG FLIGHT" is displayed on the output unit 130.

Figure 5:
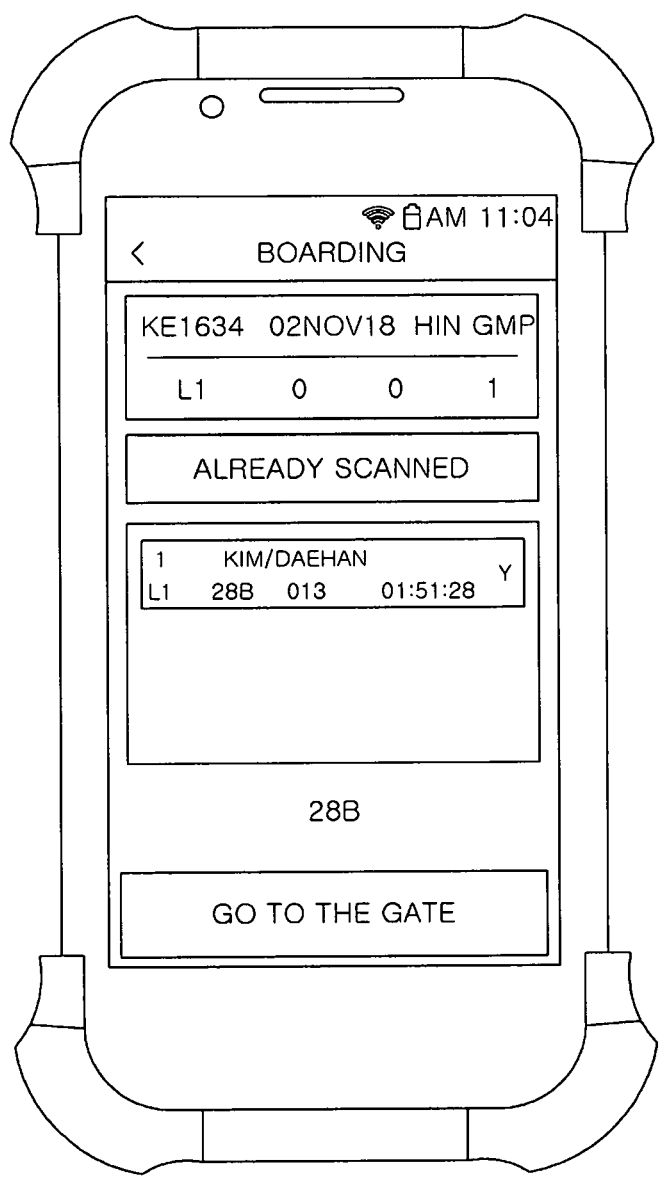
FIG. 5 illustrates an example of a screen displayed on the boarding pass processing device according to an embodiment when a duplicated boarding is determined.

In addition, the boarding processing unit 160 compares the provided information with the extracted information and determines whether the information of the passenger having the boarding pass is overlapped with the information of a passenger that already boards the airplane. In the case that the information of the passenger having the boarding pass is overlapped with the information of a passenger that already boards the airplane, the boarding processing unit 160 determines a duplicated boarding for the passenger. FIG. 5 is an example showing that "ALREADY SCANNED" is displayed on the output unit 130.

Furthermore, the boarding processing unit 160 compares the provided information with the extracted information and determines whether the passenger having the boarding pass has gone through a predetermined procedure, for example, the check-in procedure or the boarding pass verification procedure at a gate. In the case that the passenger did not go through a predetermined procedure, the boarding processing unit 160 determines that the passenger is not allowed to board the airplane. Accordingly, a message showing that the board of the passenger is not allowed may be displayed on the output unit 130. In addition, the control unit 170 may transmit a predetermined alarm message to the devices 300 to 600 that process the procedures that the passenger did not go through.

Figure 6:
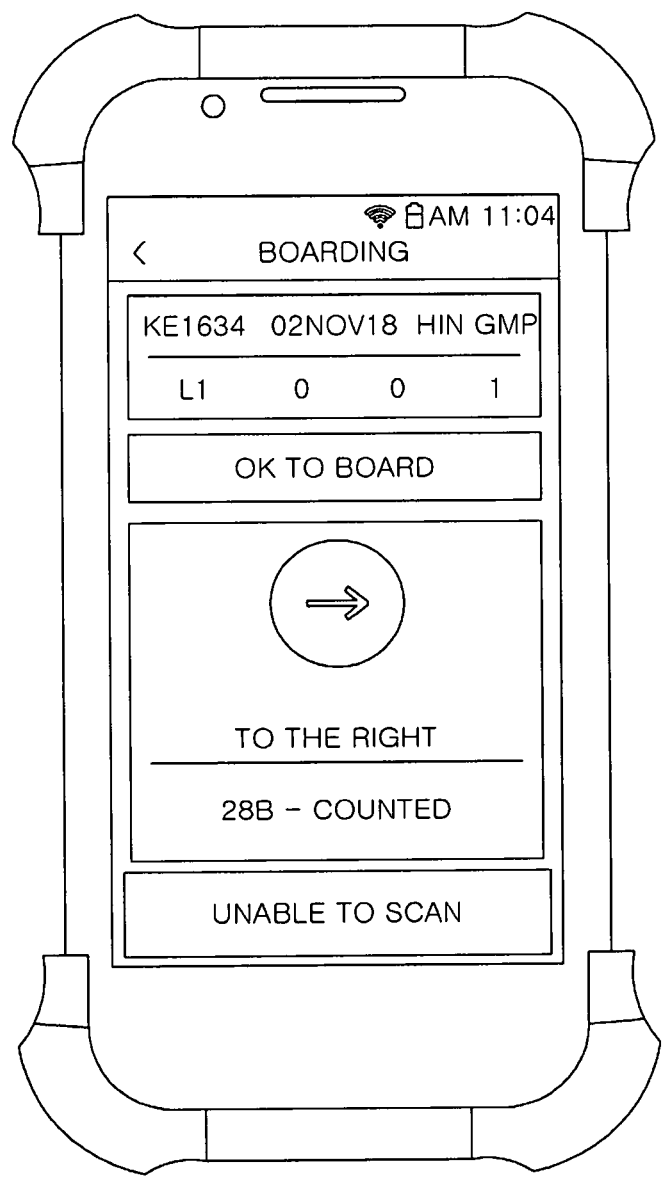
FIG. 6 illustrates an example of a screen displayed on the boarding pass processing device according to an embodiment when a normal boarding is determined.

On the other hand, the boarding processing unit 160 may determine that the boarding of the passenger is allowed from the comparison result between the provided information and the extracted information. In this case, the boarding processing unit 160 may process such that the passenger boards the airplane and update the total number of passengers on board. Furthermore, the boarding processing unit 160 may determine a guide direction toward a passenger seat for the passenger, and the output unit 130 may display the determined guide direction. FIG. 6 is an example of a display showing that the passenger is allowed to board (OK TO BOARD) and information for a guide direction toward a seat for the passenger (TO THIS RIGHT) as an example.

Here, a plurality of airplane doors may be provided in the airplane. In this case, a flight attendant may select and input an airplane door to which the boarding pass processing device 100 is disposed through the input unit 120 among the plurality of airplane doors, and the boarding processing unit 160 may determine a guide direction toward a passenger seat for the passenger by considering the position of the selected airplane door.

Meanwhile, the boarding processing unit 160 may compare the number of passengers that have completed the check-in procedure, the number of passengers that have passed through the gate, and the number of passengers counted on board. Furthermore, the comparison result may be displayed on the output unit 130, as shown in FIG. 7.

Figure 7:
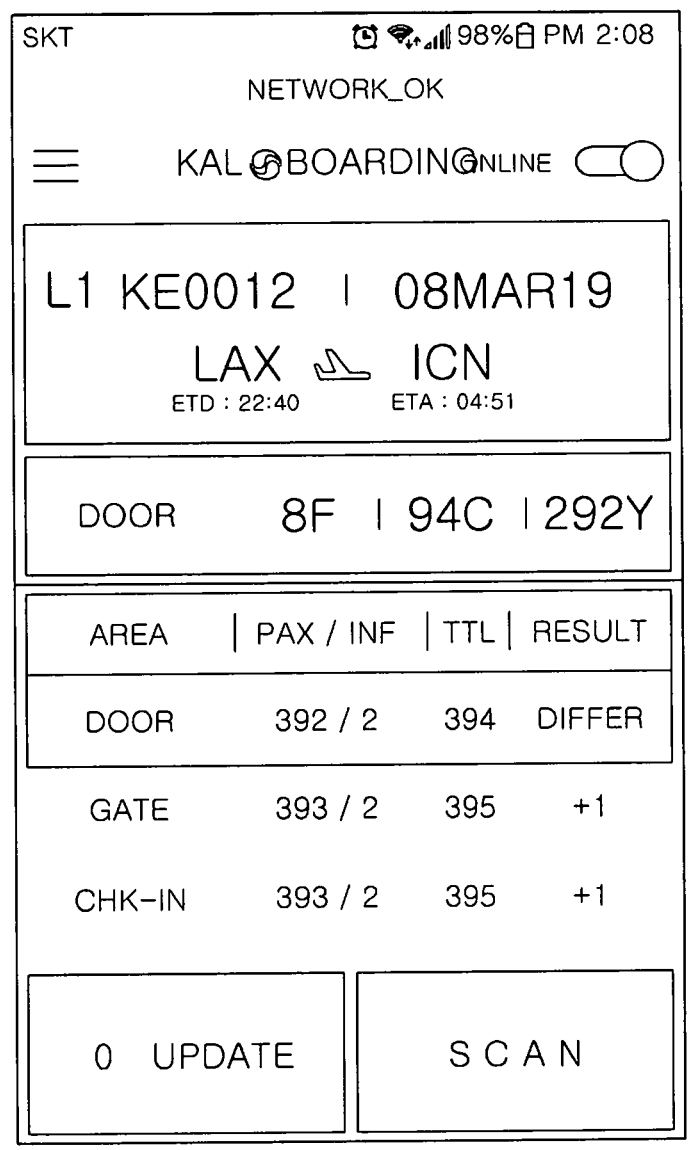

In FIG. 7, the output unit 130 displays that the number of passengers that have completed the check-in procedure is 395, the number of passengers that have passed through the gate is 395, and the number of passengers that have passed through the airplane door is 394. Here, a result of "DIFFER" is displayed for the passengers that have passed through the airplane door since although the number "395" of the passengers that have completed the check-in procedure and the number "395" of the passengers that have passed through the gate are the same, the number "394" of the passengers that have passed through the airplane door (the passengers actually on board) is different from the number "395."

In this case, when a flight attendant manipulates the input unit 120 or the output unit 130 of the boarding pass processing device 100, a screen as shown in FIG. 8 may be displayed on the output unit 130. Referring to FIG. 8, based on the displayed information on the screen, a flight attendant may identify the passenger that causes "DIFFER", the occupied seat by the passenger or the assigned seat to the passenger, and information of procedures that the passenger has gone through successfully.

Meanwhile, the boarding processing unit 160 may determine whether the boarding pass held by a passenger when passing through the gate and the boarding pass held by the passenger when passing through the airplane door are different from each other. In the case when it is determined the boarding pass held by a passenger when passing through the gate and the boarding pass held by the passenger when passing through the airplane door are different, the flight attendant may identify information of the passenger using the output unit 130 as shown in FIG. 9.

Figure 10:
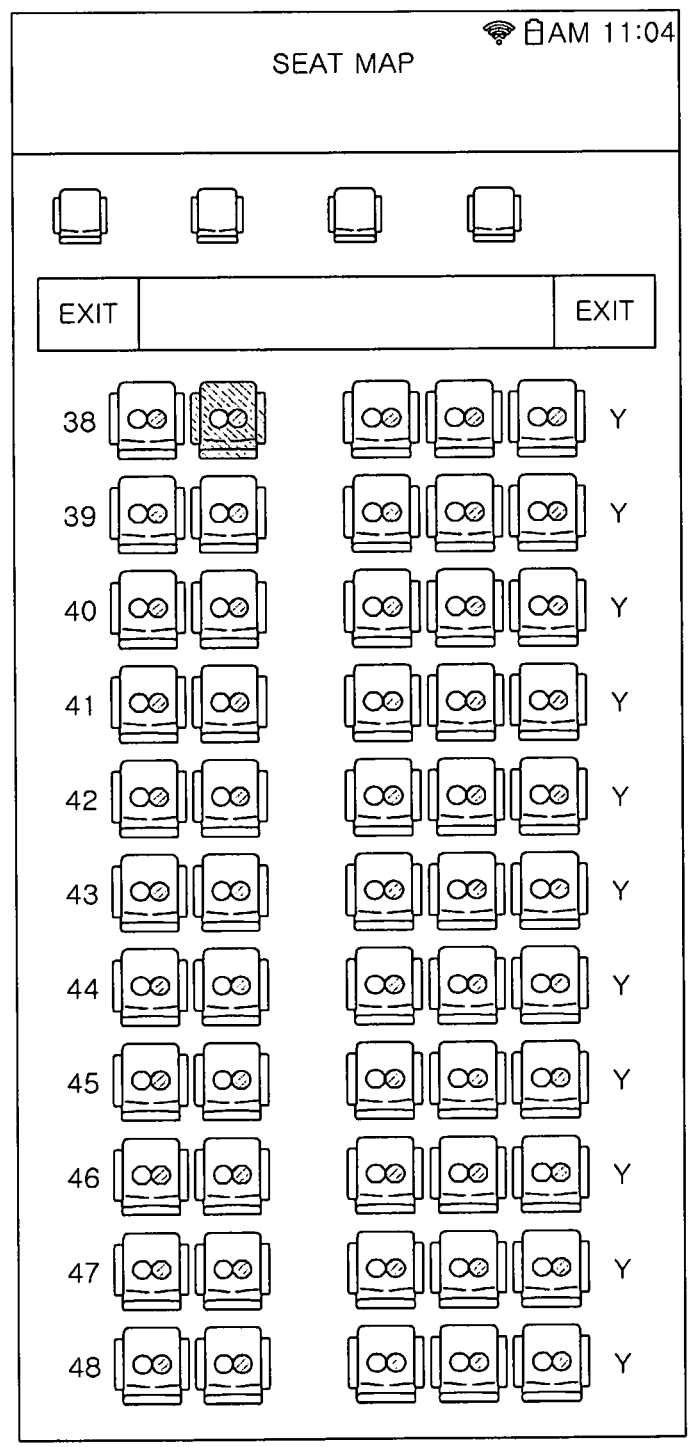
FIG. 10 shows an example of the seat map.

Further, the seat information prepared in an airplane may be displayed in a form of "SEAT MAP" on the output unit 130. FIG. 10 shows an example of the seat map. Referring to FIG. 10, a seat occupied by a passenger and a seat unoccupied by a passenger are distinctively displayed. Furthermore, although it is not shown in FIG. 10, when a flight attendant clicks each seat on the screen, information of a passenger to sit on the seat, for example, personal information for the passenger or information whether the passenger has gone through the procedures may be displayed. With this configuration, when a problem occurs, for example, the wrong boarding or the duplicated boarding occurs, when the number of passengers that have completed the check-in procedure, the number of passengers that have passed through the gate, and the number of passengers counted on board are not the same, the flight attendant may check information of a passenger that performs check-in but does not pass through the gate, a passenger that passes through the gate but does not pass through the airplane door, and information of an assigned seat.

FIG. 11 shows a result of the summation of the numbers of the passengers that have passed through respective airplane doors when there is a plurality of airplane doors in the airplane. The result of the summation is outputted through the output unit 130. Referring to FIG. 11, the number of passengers that have passed through each airplane door is shown, and it is identifiable that one passenger still does not pass through the airplane door although the passenger has gone through the check-in procedure and passes through the gate.

Figure 12:
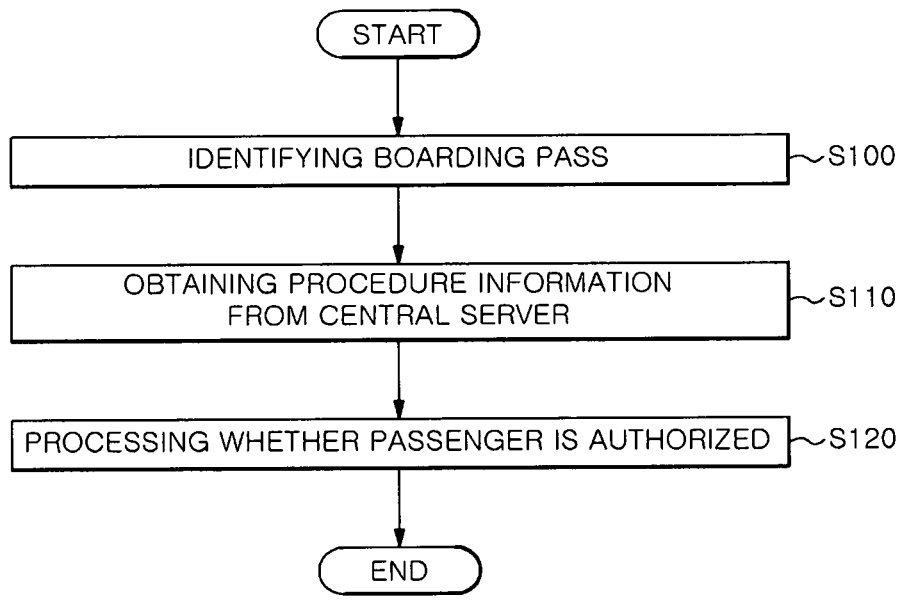
FIG. 12 is a flowchart illustrating a method for processing a boarding pass using the boarding pass processing device according to an embodiment.

FIG. 12 is a flowchart illustrating a method for processing a boarding pass using the boarding pass processing device 100 according to an embodiment. However, FIG. 12 is merely exemplary. For example, a part of the steps shown in FIG. 12 may be performed in a different order shown in FIG. 12.

Referring to FIG. 12, the following steps are performed: identifying a boarding pass held by a passenger (step S100), obtaining procedure information on whether the passenger having the identified boarding pass has gone through the procedures required to board an airplane, from the central server (step S110), and processing whether the passenger having the identified boarding pass is authorized to board based on the obtained procedure information (step S120).

Here, step S110 may be performed before or after step 100 is performed, or step 110 and step 100 may be simultaneously performed. Furthermore, according to an embodiment, the central server 200 may transmit the procedure information to the boarding pass processing device 100, so that the boarding pass processing device 100 obtains the procedure information. On the other hand, the boarding pass processing device 100 may request the procedure information to the central server 200 to obtain the procedure information.

Hereinafter, the description described with reference to the boarding pass processing device 100 may be applied to the method for processing a boarding pass.

As described above, the boarding pass verification procedure at the airplane door and the check procedure before a takeoff may be performed by the boarding pass processing device 100 according to the embodiment, not by a human. Therefore, a wrong boarding or a duplicated boarding of a passenger may be verified quickly and without an error.

In addition, the procedure of counting the number of passengers that have passed through the airplane door and the procedure of comparing the number of passengers that have completed the check-in procedure and the number of passengers that have passed through the gate with the number of passengers that have passed through the airplane door may also be performed by the boarding pass processing device 100 according to the embodiment. Accordingly, the time consumed for the counting procedure and the comparison procedure is reduced, and a takeoff delay of the airplane may be prevented.

Furthermore, in the case that the number of passengers that have completed the check-in procedure, the number of passengers that have passed through the gate, and the number of passengers counted on board are not matched with one another, a flight attendant may check the passenger that causes the problem, the occupied seat by the passenger or the assigned seat to the passenger, and the information of procedures that the passenger has gone through successfully by using the boarding pass processing device 100 according to the embodiment.

Meanwhile, the method for processing a boarding pass according to the embodiment may be implemented as a form of computer program (computer-executable instructions) stored in a computer-readable storage medium to perform each step of the method.

The explanation as set forth above is merely described a technical idea of the exemplary embodiments of the present disclosure, and it will be understood by those skilled in the art to which this disclosure belongs that various changes and modifications is made without departing from the scope and spirit of the claimed invention as disclosed in the accompanying claims. Therefore, the exemplary embodiments disclosed herein are not used to limit the technical idea of the present disclosure, but to explain the present disclosure. The scope of the claimed invention is to be determined by not only the following claims but also their equivalents. Specific terms used in this disclosure and drawings are used for illustrative purposes and not to be considered as limitations of the present disclosure. Therefore, the scope of the claimed invention is construed as defined in the following claims and changes, modifications and equivalents that fall within the technical idea of the present disclosure are intended to be embraced by the scope of the claimed invention.

What is claimed is:

1. A boarding pass processing system comprising, interconnected through a network:
    a central server;
    procedure passing units adapted to provide procedure information, on whether a passenger having a boarding pass has gone through procedures required to board an airplane, to the central server, the procedure passing units comprising at least a check-in procedure processing unit, a security check procedure processing unit, and a gate passing procedure processing unit,
    wherein the procedure information includes information for a check-in procedure carried out by the check-in procedure processing unit, for issuing the boarding pass to the passenger, a security check procedure carried out by the security check procedure processing unit, and a boarding pass verification procedure carried out by the gate passing procedure processing unit at a gate for the passenger having the boarding pass to board the airplane after the check-in procedure and the security check procedure; and
    a boarding pass processing device to be disposed at an airplane door of the airplane for processing a boarding pass, the boarding pass processing device comprising:
        a communication unit configured to communicate with the central server;
        a boarding pass identification unit configured to identify the boarding pass held by the passenger; and
        a boarding processing unit configured to process, when procedure information on whether the passenger having the boarding pass identified by the boarding pass identification unit has gone through the check-in procedure, the security check procedure, and the boarding pass verification procedure required to board the airplane is obtained from the central server through the communication unit, whether the passenger having the identified boarding pass is authorized to board based on the obtained procedure information,
    wherein seat information prepared in the airplane is obtained from the central server through the communication unit,
    wherein the boarding processing unit is configured to receive the information for the identified boarding pass from the boarding pass identification unit, extract seat information of the passenger having the identified boarding pass from the information for the identified boarding pass, and determine a guide direction toward a passenger seat for the passenger having the identified boarding pass based on the extracted seat information and the obtained seat information, and
    wherein the boarding processing unit further includes an output unit configured to display the determined guide direction,
    the system further comprising:
    an input unit configured to receive information for the airplane door to which the boarding pass processing device for processing a boarding pass is disposed among a plurality of airplane doors provided in the airplane,
    wherein the boarding processing unit is configured to determine the guide direction toward the passenger seat for the passenger having the identified boarding pass by additionally considering the input information for the airplane door to which the boarding pass processing device for processing a boarding pass is disposed.

2. The boarding pass processing system of claim 1, further comprising:
    a control unit configured to identify information for a procedure that the passenger having the identified boarding pass has not gone through and transmit an alarm message to a device that processes the procedure that the passenger having the identified boarding pass has not gone through.

3. The boarding pass processing system of claim 1, further comprising:
    an output unit configured to identify information for a procedure that the passenger having the identified boarding pass has not gone through and output the information for the procedure that the passenger having the identified boarding pass has not gone through.

4. The boarding pass processing system of claim 1, wherein flight information of the airplane is obtained from the central server through the communication unit, and
    wherein the boarding processing unit receives the information for the identified boarding pass from the boarding pass identification unit, extracts flight information of the airplane from the information for the identified boarding pass, compares the obtained flight information of the airplane with the extracted flight information of the airplane, and determines whether the passenger having the identified boarding pass duly boards the airplane.

5. The boarding pass processing system of claim 1, wherein information for the passenger on board is obtained from the central server through the communication unit, and
    wherein the boarding processing unit determines whether the passenger having the identified boarding has already been checked based on the information for the passenger on board.

6. The boarding pass processing system of claim 1, wherein the boarding processing unit calculates a total number of passengers on board whenever a boarding pass is checked by the boarding pass identification unit.

7. The boarding pass processing system of claim 1, wherein information for the passengers on board through a plurality of airplane doors provided in the airplane is obtained from the central server through the communication unit, and wherein the boarding processing unit calculates a total number of passengers on board based on the obtained information for the passengers on board.

8. The boarding pass processing system of claim 1, wherein the boarding processing unit obtains a total number of passengers that have gone through the procedures from the obtained procedure information, and obtains a total number of passengers having boarding passes identified by the boarding pass identification unit, and wherein the boarding pass processing device further includes:

an output unit configured to display information for one or more passengers that cause a difference between the total number of passengers that have gone through the procedures and the total number of passengers having the boarding passes identified by the boarding pass identification unit.

9. A method for processing a boarding pass using a boarding pass processing device for processing the boarding pass in a boarding pass processing system comprising, interconnected through a network, the boarding pass processing device to be disposed at an airplane door of an airplane, a central server, procedure passing units for providing procedure information, on whether a passenger having a boarding pass has gone through procedures required to board the airplane, to the central server, the procedure passing units comprising at least a check-in procedure processing unit, a security check procedure processing unit, and a gate passing procedure processing unit, wherein the procedure information includes information for a check-in procedure carried out by the check-in procedure processing unit, for issuing the boarding pass to the passenger, a security check procedure carried out by the security check procedure processing unit, and a boarding pass verification procedure carried out by the gate passing procedure processing unit at a gate for the passenger having the boarding pass to board the airplane after the check-in procedure and the security check procedure, the method comprising:

carrying out the check-in procedure by the check-in procedure processing unit and providing the check-in procedure information to the central server;

carrying out the boarding pass verification procedure by the gate passing procedure processing unit at the gate and providing the boarding pass verification procedure information to the central server;

identifying a boarding pass held by a passenger by the boarding pass processing device to be disposed at the airplane door of the airplane;

obtaining by the boarding pass processing device to be disposed at the airplane door of the airplane, the procedure information on whether the passenger having the identified boarding pass has gone through the check-in procedure, the security check procedure, and the boarding pass verification procedure required to board the airplane, from the central server; and processing whether the passenger having the identified boarding pass is authorized to board based on the obtained procedure information, wherein seat information prepared in the airplane is obtained from the central server, wherein the boarding pass processing device receives information for the identified boarding pass, extracts seat information of the passenger having the identified boarding pass, and determines a guide direction toward a passenger seat for the passenger having the identified boarding pass based on the extracted seat information and the obtained seat information, and wherein the boarding pass processing device further includes an output unit configured to display the determined guide direction, the boarding pass processing system further comprising:

an input unit configured to receive information for the airplane door to which the boarding pass processing device for processing a boarding pass is disposed among a plurality of airplane doors provided in the airplane, wherein the boarding pass processing device determines the guide direction toward the passenger seat for the passenger having the identified boarding pass by additionally considering the input information for the airplane door to which the boarding pass processing device for processing a boarding pass is disposed.

10. A non-transitory computer-readable storage medium storing instructions, when executed by one or more processors, to perform the method of claim 9.

11. The system of claim 1, wherein the boarding processing unit is configured to determine a wrong boarding for the passenger in response to information of the passenger having the boarding pass being not included in information of total passengers scheduled to board the airplane.

12. The system of claim 1, wherein the boarding processing unit is configured to determine a duplicated boarding for the passenger in response to information of the passenger having the boarding pass overlaps information of another different passenger that already boards the airplane.

\* \* \* \* \*